US005597496A

United States Patent [19]

Masaichi et al.

[11] Patent Number: 5,597,496

[45] Date of Patent: Jan. 28, 1997

[54] METHOD FOR MANUFACTURING A MAGNETIC HEAD SUSPENSION PROVIDED WITH CIRCUIT WIRING

[75] Inventors: Inaba Masaichi; Matsumoto Hirofumi, both of Ushiku; Tanaka Yasuyuki, Tsuchiura, all of Japan

[73] Assignee: Nippon Mektron, Ltd., Tokyo, Japan

[21] Appl. No.: 465,757

[22] Filed: Jun. 6, 1995

[30] Foreign Application Priority Data

Jul. 15, 1994 [JP] Japan .................................... 6-186457

[51] Int. Cl.$^{6}$ .................................................. G11B 5/48

[52] U.S. Cl. ................................ 216/94; 216/52; 216/75; 360/103; 360/104

[58] Field of Search ................................ 216/75, 100, 94, 216/52; 430/320, 323; 360/103, 104

[56] References Cited

U.S. PATENT DOCUMENTS 3,503,815 3/1970 Johnson .
4,432,027 2/1984 Higuchi .................................. 360/104
4,823,217 4/1989 Kato et al. ............................. 360/104
5,339,217 8/1994 Cohen et al. ........................... 361/707

FOREIGN PATENT DOCUMENTS 53-74414 7/1978 Japan .
63-113917 5/1988 Japan .

*Primary Examiner*—Thorl Chea
*Attorney, Agent, or Firm*—Chilton, Alix & Van Kirk

[57] ABSTRACT

A method of manufacturing a magnetic head suspension, wherein a wiring member for connecting a magnetic head element with a read/write amplifier circuit board is integrally formed with the suspension, which includes the step of: (1) forming a laminated plate having a flexible insulating base material which has an electrically conductive layer on one surface and a springy metal layer on the other surface; (2) photoetching the electrically conductive layer of the laminated plate to form a metal mask having a desired shape which does not cover an exposed area of the flexible insulating base material; (3) removing the flexible insulating base material from the exposed area; (4) photoetching the metal mask to produce a circuit wiring pattern; (5) producing a surface protecting layer on the surface of the circuit wiring pattern; and (6) photoetching the springy metal layer and bending the springy metal layer to form a suspension having a desired shape.

13 Claims, 4 Drawing Sheets

3 3 4 2 1

METHOD FOR MANUFACTURING A MAGNETIC HEAD SUSPENSION PROVIDED WITH CIRCUIT WIRING

BACKGROUND OF THE INVENTION

1. Field of the Invention

The present invention generally relates to a method for manufacturing a magnetic head suspension assembly used for a magnetic disk unit or the like. More particularly, the present invention relates to a method of manufacturing a magnetic head suspension wherein a wiring member for connecting a magnetic head element with a read/write amplifier circuit board is integrally formed with a suspension.

2. Description of the Related Art

This type of magnetic disk unit is equipped with at least one rotary disk for magnetically recording information, a magnetic head element, for reading from or writing to, each track on the disk, and a head positioning actuator which is connected with the head element. The positioning actuator is used to move the head element to a desired track and maintain the head element above the selected track.

An example of a conventional magnetic head suspension assembly is disclosed in Japanese Patent Laid-Open No. 63-113917. In this art, the magnetic head element is attached to a flexure by epoxy resin or the like and the flexure is installed on a load beam by laser welding or the like. Gold-plated copper lead wire provided with urethane coating or the like is connected by ultrasonic bonding, soldering, or the like to an electrode formed on the magnetic head element, thus forming a leader wiring section for sending a signal from the magnetic head to an external circuit. The wiring member is turned a number of times before it is housed in a flexible insulating resinous tube and mounted on the suspension by crimping a part of the suspension or other similar means.

Such a magnetic head suspension assembly suffers from the problem that the connection between an electrode on the magnetic head element and the leader wiring is extremely inefficient due to restrictions on operability, making it difficult to achieve higher productivity. This problem has been exacerbated due to the increasing number of terminals resulting from the reduced sizes of magnetic head elements and the increasing use of MR elements in recent years. Furthermore, an additional problem arises because the rigidity of the leader wiring member prevents the magnetic head element from obtaining an optimum position when it floats. A final problem is that the leader wiring member is subjected to wind pressure from air flow produced by a rotating recording medium, which disturbs the position of a floating magnetic head element.

To solve these problems, the art disclosed under Japanese Patent Laid-Open No. 53-74414 employs a flexible circuit board, which also serves as the leader wiring member and the suspension mechanism to support the magnetic head element. This art, however, presents many problems in achieving accurate positioning, applying the appropriate load, and appropriate floating position of the magnetic head since these are all basically required of the suspension mechanism, it can hardly be employed for the magnetic disk units with higher density used these days.

According to one popular approach to solving the problems regarding conventional leader wiring, a flexible circuit board, which is used to include all wiring is attached to a suspension spring with an adhesive agent or the like. This approach, however, unavoidably trades off weight reduction for operability because a separate flexible circuit board must be glued to the suspension spring. Whereas, preferably, the composing member which serves as a servo mechanical element should be lighter to meet the demand for faster seek, etc.

Hence, there has been a demand for a magnetic head suspension assembly which reduces the adverse influences on the floating position of the magnetic head exerted by the leader wiring member and also permits easier mounting of the magnetic head element by combining the leader wiring member and the suspension into one piece.

SUMMARY OF THE INVENTION

It is, accordingly, an object of the present invention to provide a method of manufacturing a magnetic head suspension assembly with circuit wiring which allows a leader wiring member and a suspension to be combined into a single magnetic head unit.

To this end, the present invention provides a method of manufacturing a magnetic head suspension assembly which includes the steps of: (1) forming a laminated plate having a flexible insulating base material with an electrically conductive layer on one surface and a springy (i.e., resilient) metal layer on the other surface; (2) photoetching the electrically conductive layer of the laminated plate to produce a metal mask of a desired base member shape and to thereby expose to view a portion of the base material; (3) removing the portion of the flexible insulating base material which is exposed to view by the irradiation with excimer laser beams or resin etching; (4) forming a desired circuit wiring pattern by selectively removing the metal mask; (5) forming a surface protecting layer on the surface of the circuit wiring pattern by the photofabrication process employing a photosensitive insulating resin; (6) photoetching the springy metal layer and bending it into a predetermined shape to form a suspension having a desired shape.

The flexible insulating base material of the aforementioned laminated plate may be a non-photosensitive polyimide made of a soluble polyimide, a polyimide precursor or the like. Some examples of appropriate polyimides include polyamic acid, or a photosensitive insulating resin made of photosensitive polyimide, photosensitive epoxy resin, photosensitive acrylic resin, or the like.

Use of the aforementioned materials makes it possible to easily form the insulating base material into a desired shape by removing the insulating base material using a relatively mild chemical a further advantage is that the curing process can be performed without the need of the ablation removing treatment using excimer laser beams or the resin etching removal process using hazardous chemicals, such as hydrazine, to partially remove the insulating base material after forming the metal mask.

After forming the insulating base material into the desired shape, a predetermined circuit wiring pattern is produced by photoetching the metal mask. The surface protecting layer is formed on the surface of the circuit wiring pattern by the photofabrication process using photosensitive insulating resin. Then the aformentioned springy metal layer is photoetched and bent into a predetermined shape, thereby producing a suspension of a desired shape.

DESCRIPTION OF THE PREFERRED EMBODIMENTS

Figure 1:
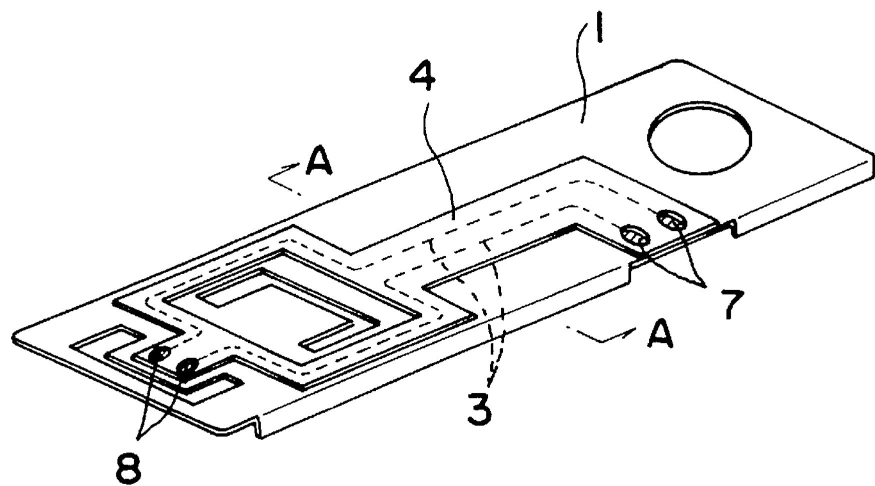
FIG. 1 is a conceptual perspective view showing a magnetic head suspension equipped with circuit wiring produced by the manufacturing method in accordance with the present invention.
Figure 2:
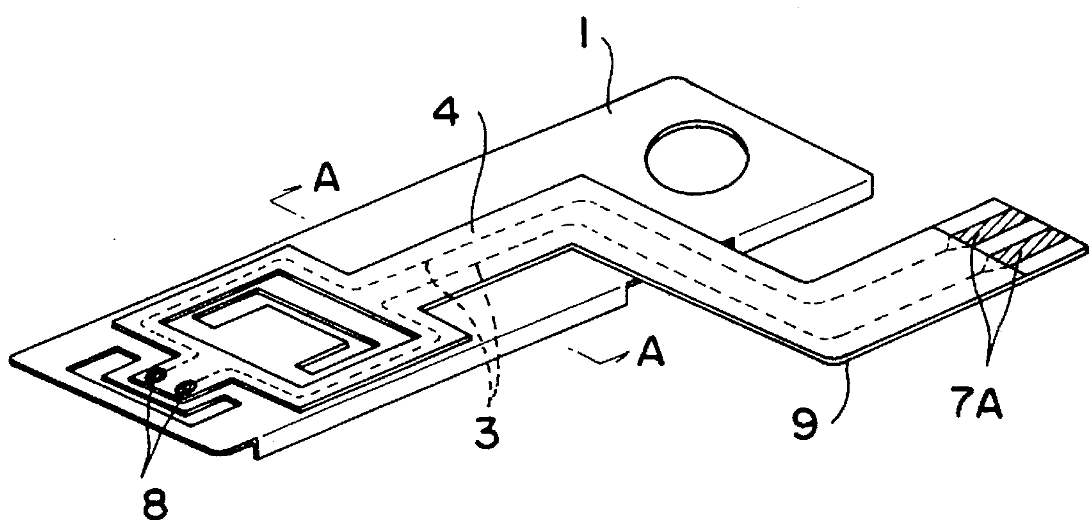
FIG. 2 is a conceptual perspective view showing another example of the magnetic head suspension equipped with circuit wiring produced by the manufacturing method in accordance with the present invention.

FIG. 1 and FIG. 2 are conceptual perspective views of the magnetic head suspension equipped with circuit wiring assembly produced by the method of manufacturing of the present invention. In the magnetic head suspension shown in FIG. 1 and FIG. 2, the wiring member for connecting a magnetic head element with a read/write amplifier circuit board and the suspension are combined into one piece.

According to the embodiment of the magnetic head suspension equipped with the circuit wiring shown in FIG. 1, the whole flexible insulating base material and a circuit wiring pattern 3, which is formed on the insulating base material and covered with a surface protecting layer 4, are formed on a suspension 1 made of springy metal.

The embodiment of the magnetic head suspension equipped with the circuit wiring shown in FIG. 2 includes a flexible insulating base material, which extends at an extension 9 toward the top surface of the suspension 1 made of springy metal and toward outside thereof. The circuit wiring pattern 3 is formed on the insulating base material and covered with the surface protecting layer 4. The circuit wiring pattern 3 formed on the extension 9 provides a leader pattern section which has terminal 7A.

In the embodiments shown in FIG. 1 and FIG. 2, holes are formed in predetermined positions of the surface protecting layer 4 to expose to view a part of the circuit wiring pattern 3 and the exposed section is provided with a surface-treated layer of solder, gold, or the like to form connecting terminals 8. The embodiment shown in FIG. 1 includes terminals 7 for external connection which are formed at the verge of the suspension 1 in the same manner.

Figure 3:
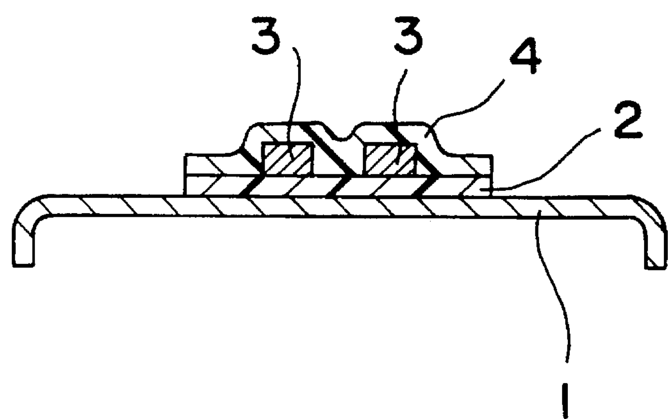
FIG. 3 is a conceptual cross-sectional block diagram taken along line A—A of FIG. 1 and FIG. 2.

FIG. 3 is a conceptual cross-sectional diagram taken along line A—A of FIG. 1 and FIG. 2. In FIG. 3, reference numeral 1 denotes a suspension made of springy metal such as stainless steel. A predetermined surface area of the suspension 1 is covered with the flexible insulating base material 2 made of polyimide, epoxy resin, acrylic resin, or the like. The desired circuit wiring pattern 3 is formed in a predetermined position on the surface of the flexible insulating base material 2. Further, the surface protecting layer 4, which is made of a photosensitive insulating resin or the like, is formed on the surface of the circuit wiring pattern 3.

FIG. 4*a* through FIG. 4*e* illustrate one embodiment of the method of manufacturing a magnetic head suspension assembly of the present invention. As with FIG. 3, in FIG. 4*a* through FIG. 4*e* are cross-sectional diagrams taken along line A—A of in FIG. 1 and FIG. 2.

Figure 4A:
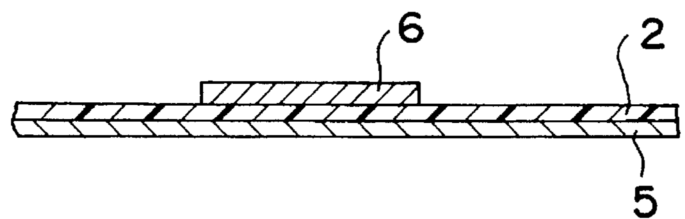
FIG. 4*a* through FIG. 4*e* illustrate one embodiment of the method of manufacturing a magnetic head suspension assembly with circuit wiring according to the present invention.

In FIG. 4*a*, the flexible insulating base material 2, which is made of polyimide, epoxy resin, acrylic resin, or the like, has a springy metal layer 5 of stainless steel or the like, for forming the suspension on one surface thereof and a laminated plate having an electrically conductive layer of copper foil or the like on the other surface. The electrically conductive layer is photoetched in a conventional manner to selectively remove material and thereby produce a metal mask 6, which matches the desired shape of base member so as to shield it against the excimer laser (i.e., the portion of the base member, or flexible insulating base material, which is to be removed is exposed to view). For better flexibility, a laminated plate with no adhesive agent between composing layers should be used; however, a laminated plate laminated with an adhesive agent between composing layers may be used when an excimer laser is employed. The following process uses the adhesive-less laminated plate.

Figure 4B:
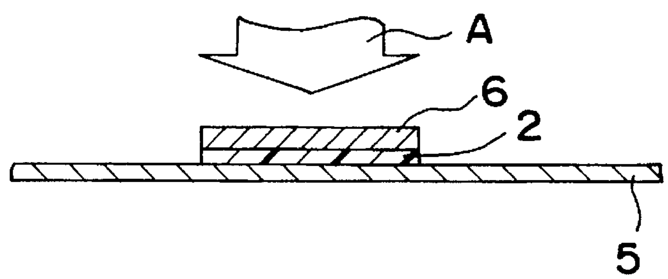

In the next step, as illustrated in FIG. 4*b*, excimer laser beam A irradiates the metal mask 6 the portion of the insulating base material 2 which is exposed to view to remove by ablation. Alternatively the exposed insulating base material 2 can also be removed by resin-etching with a strong alkaline chemical such as hydrazine, where the metal mask 6 is used as the etching mask.

Figure 4C:
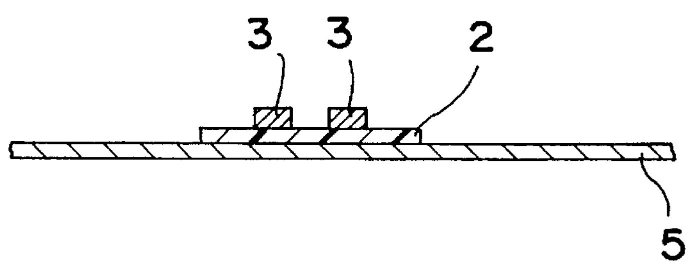
Figure 4D:
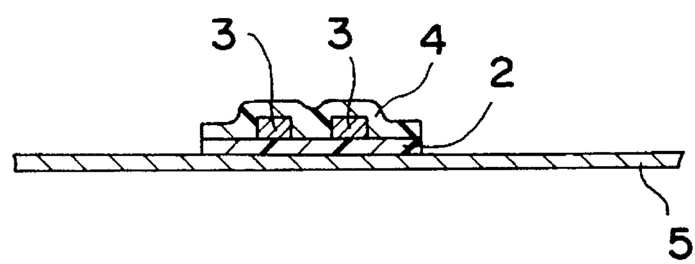

After forming the desired circuit wiring pattern 3 by photoetching the metal mask 6 as shown in FIG. 4*c*, the surface protecting layer 4 is produced by carrying out a series of steps including: (1) the application of photosensitive insulating resin to the circuit wiring pattern 3; (2) exposure; (3) development; and (4) curing of the applied photosensitive insulating resin as shown in FIG. 4*d*.

Figure 4E:
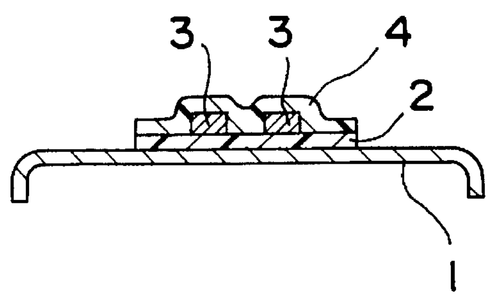

Lastly, as shown in FIG. 4*e*, the springy metal layer 5 is photoetched and bent into a desired shape to form the single suspension 1, thus producing the magnetic head suspension combined with the circuit wiring.

FIG. 5*a* through FIG. 5*e* illustrate a similar embodiment of the method of manufacturing a magnetic head suspension assembly according to the present invention. The laminated plate used for this embodiment has a flexible insulating base material 2 made of a non-photosensitive polyimide composed of a soluble polyimide or a polyimide precursor or the like such as polyamic acid. The flexible insulating base material 2 has a springy metal layer 5 of stainless steel or the like, for forming the suspension, on one surface and an electrically conductive layer, of copper foil or the like, on the other surface.

To obtain such a laminated plate, the non-photosensitive polyimide is clad to one surface of either the springy metal layer or the electrically conductive layer, then the other metal layer is attached and they are subjected to precuring treatment to complete the laminated plate. Alternative, the other metal layer may be attached after the precuring treatment to complete the laminated plate. As another alternative, the non-photosensitive polyimide is clad to one surface of the springy metal layer and also to one surface of the electrically conductive layer. Then, they can be either (1) subjected to the precuring treatment to laminate them or (2) they can be laminated before the precuring treatment to complete the laminated plate.

Figure 5A:
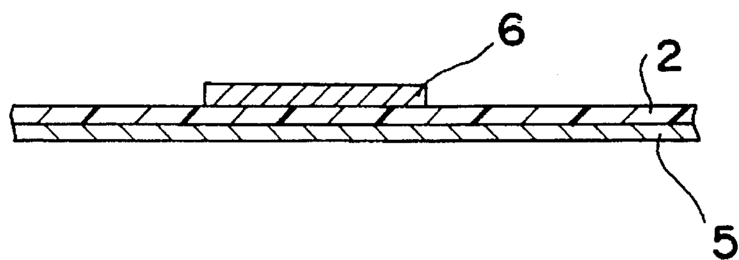
FIG. 5*a* through FIG. 5*e* illustrate another embodiment of the method of manufacturing a magnetic head suspension according to the present invention.
Figure 5B:
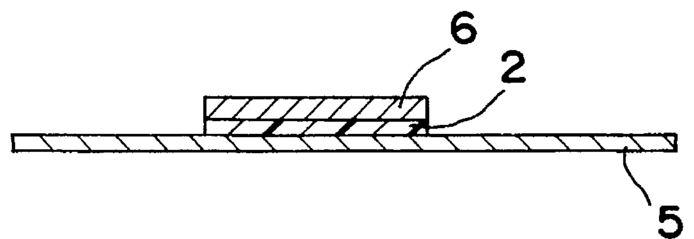

The electrically conductive layer of the laminated plate thus produced, is photoetched to form the metal mask 6 which matches the desired configuration of the insulating base member as shown in FIG. 5*a*. As shown in FIG. 5*b*, the metal mask 6 can be used as a resist layer, and the portion of the insulating base material 2 which is exposed to view can be removed with a developer suited for the insulating resin used for the insulating base material 2 before it is subjected to the curing process. This results in the same construction as that shown in FIG. 4*b*.

Figure 5C:
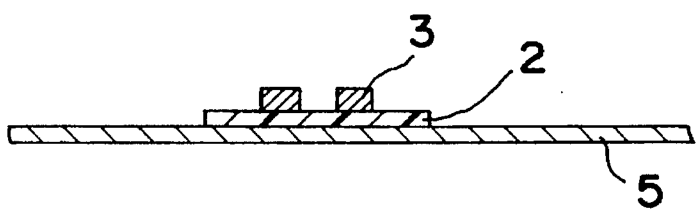
Figure 5D:
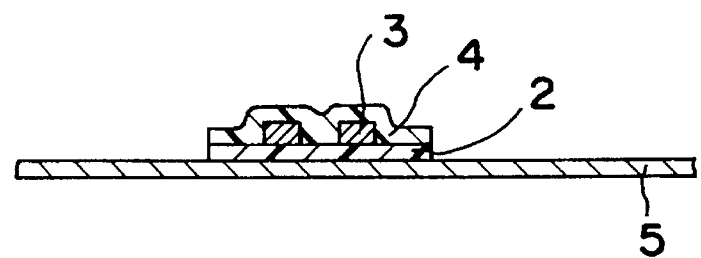
Figure 5E:
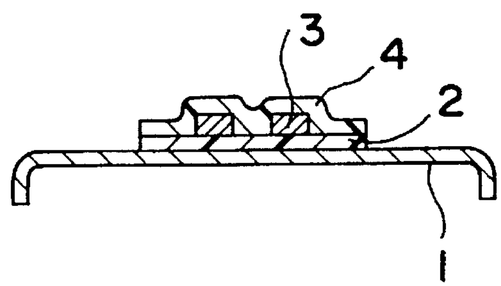

Next the steps illustrated in FIG. 5*c* through FIG. 5*e* are carried out in the same manner as those illustrated in FIG. 4*c* through FIG. 4*e*. These steps include (1) forming the circuit wiring pattern 3; (2) producing the surface protecting layer 4; and (3) producing the suspension 1. Thus, a single magnetic head suspension combined with the circuit wiring can be produced as in the embodiment described above.

An alternative embodiment of the present invention includes a variation on the process illustrated in FIG. 5*a* and FIG. 5*b*. This alternative process uses a photosensitive insulating resin composed of photosensitive polyimide, photosensitive epoxy resin, photosensitive acrylic resin, or the like, for the flexible insulating base material 2.

As described above, the flexible insulating base material 2 has the springy metal layer 5 of stainless steel or the like, for forming the suspension on one surface and the laminated plate having the electrically conductive layer of copper foil or the like on the other surface. The same process as described in the embodiment above may be employed to make the laminated plate.

The electrically conductive layer of the laminated plate thus produced, is photoetched to form the metal mask 6 which matches the desired configuration of the insulating base member as shown in FIG. 5*a*. As with the embodiment shown in FIG. 5*b*, by using the metal mask 6 as a resist layer, the portion of the insulating base material 2 which is exposed to view is removed by exposure and development before it is subjected to the curing process, resulting in the same construction as that shown in FIG. 4*b*.

Next the steps illustrated in FIG. 5*c* through FIG. 5*e* are carried out. These steps include: (1) forming the circuit wiring pattern 3; (2) producing the surface protecting layer 4; and (3) producing the suspension 1. Thus, a single magnetic head suspension combined with circuit wiring can be produced as in the embodiment described above.

The method of manufacturing a single magnetic head suspension equipped with circuit wiring in accordance with the present invention allows desired circuit wiring to be integrally formed with the suspension, thereby eliminating the need for gluing a discrete flexible circuit board to a suspension as in the past. Thus, the present invention eliminates the need to trade-off weight reduction to achieve operability.

Furthermore, since the metal mask used as a shield during laser beam ablation, or resin etching, can be produced by the first etching of the electrically conductive layer to form the circuit wiring pattern; an additional step of producing a separate beam shielding mask or resist layer is no longer necessary.

In addition, using a non-photosensitive polyimide or photosensitive insulating resin for the flexible insulating base material of the laminated plate makes it possible to form the insulating base material into a desired shape by using a mild chemical instead of a hazardous chemical such as hydrazine.

In conclusion, the method of manufacturing a magnetic head suspension of the present invention makes it possible to stably provide a magnetic head suspension with circuit wiring, which is capable of achieving improved operability and reduced weight while at the same time ensuring accurate positioning, application of appropriate load, and appropriate floating position of the magnetic head element as required of a suspension.

What is claimed is:

1. A method of manufacturing a magnetic head suspension assembly with integrally formed circuit wiring, comprising the steps of:

forming a laminated plate having a flexible insulating base material with opposing first and second surfaces, an electrically conductive layer disposed on the first surface of the base material and a springy metal layer disposed on the second surface of the base material;

selectively removing the electrically conductive layer from the laminated plate to thereby expose to view a portion of the first surface of the base material;

removing from the plate the portion of the base material having the first surface thereof exposed to view;

further selectively removing the electrically conductive layer from the plate to thereby produce a desired circuit wiring pattern from the remaining electrically conductive layer;

producing a surface protecting layer on the surface of the circuit wiring pattern; and shaping the springy metal layer into a predetermined shape.

2. A method of manufacturing a magnetic head suspension assembly with circuit wiring according to claim 1, wherein the portion of the base material having the first surface thereof exposed to view is removed from the plate by irradiating the portion of the base material having the first surface thereof exposed to view with an excimer laser beam.

3. A method of manufacturing a magnetic head suspension with circuit wiring according to claim 1, wherein the portion of the base material having the first surface thereof exposed to view is removed by using a resin etching process.

4. A method of manufacturing a magnetic head suspension assembly with circuit wiring according to claim 1, wherein the step of shaping comprises photoetching the springy metal layer and bending it into a predetermined shape.

5. A method of manufacturing a magnetic head suspension assembly with integrally formed circuit wiring, comprising the steps of:

forming a laminated plate having a flexible insulating base material with opposing first and second surfaces, the base material being made of a non-photosensitive polyimide, the plate also having an electrically conductive layer disposed on the first surface of the base material and a springy metal layer disposed on the second surface of the base material;

selectively removing the electrically conductive layer from the plate to thereby expose to view a portion of the first surface of the base material;

chemically removing from the plate the portion of the base material having the first surface thereof exposed to view;

curing the remaining portion of the base material;

further selectively removing the electrically conductive layer from the plate to produce a desired circuit wiring pattern from the remaining electrically conductive layer;

producing a surface protecting layer on the surface of the circuit wiring pattern; and shaping the springy metal layer into a predetermined shape.

6. A method of manufacturing a magnetic head suspension assembly with circuit wiring according to claim 5, wherein the non-photosensitive polyimide is a soluble polyimide.

7. A method of manufacturing a magnetic head suspension assembly with circuit wiring according to claim 5, wherein the non-photosensitive polyimide is a polyimide precursor.

8. A method of manufacturing a magnetic head suspension assembly with circuit wiring according to claim 5, wherein the step of shaping comprises photoetching the springy metal layer and bending it into a predetermined shape.

9. A method of manufacturing a magnetic head suspension assembly with integrally formed circuit wiring, comprising the steps of:

forming a laminated plate having a flexible insulating base material with opposing first and second surfaces, the base material being made of a photosensitive insulating resin, the plate also having an electrically conductive layer disposed on the first surface of the base material and a springy metal layer disposed on the second surface of the base material;

selectively removing the electrically conductive layer from the plate to thereby expose to view a portion of the first surface of the base material;

removing from the plate the portion of the base material having the first surface thereof exposed to view by using an exposing means and a developing means;

curing the remaining portion of the base material;

further selectively removing the electrically conductive layer from the plate to thereby produce a desired circuit wiring pattern from the remaining electrically conductive layer;

producing a surface protecting layer on the surface of the circuit wiring pattern using a photofabrication process which employs a photosensitive insulating resin; and shaping the springy metal layer into a predetermined shape.

10. A method of manufacturing a magnetic head suspension assembly with circuit wiring according to claim 9, wherein the photosensitive insulating resin is a photosensitive polyimide.

11. A method of manufacturing a magnetic head suspension assembly with circuit wiring according to claim 9, wherein the photosensitive insulating resin is a photosensitive epoxy resin.

12. A method of manufacturing a magnetic head suspension assembly with circuit wiring according to claim 9, wherein the photosensitive insulating resin is a photosensitive acrylic resin.

13. A method of manufacturing a magnetic head suspension assembly with circuit wiring according to claim 7, wherein the step of shaping comprises photoetching the springy metal layer and bending it into a predetermined shape.

* * * * *

UNITED STATES PATENT AND TRADEMARK OFFICE

CERTIFICATE OF CORRECTION

PATENT NO. : 5,597,496

DATED : January 28, 1997

INVENTOR(S) : Masaichi Inaba et al

It is certified that error appears in the above-indentified patent and that said Letters Patent is hereby corrected as shown below:

Title page, item [75], "Inaba Masaichi" should read --Masaichi Inaba--; "Matsumoto Hirofumi" should read --Hirofumi Matsumoto--; "Tanaka Yasuyuki" should read --Yasuyuki Tanaka--; abstract line 4, "step" should read --steps--.

Column 1, line 61, "since" should read --element. Since--; line 66, insert a comma after "wiring".

Column 2, line 26, "photoetching" should read --selectively removing--; line 31, delete "the"; line 33, "selectively removing" should read --photoetching--; line 49, "chemical a" should read --chemical. A--.

Column 4, line 19, after "mask 6" insert --to remove--; lines 20 and 21, delete "to remove"; line 21, insert a comma after "Alternatively"; line 52, "Alternative" should read --Alternatively--.

Column 5, line 51, change the semicolon to a comma.

UNITED STATES PATENT AND TRADEMARK OFFICE
CERTIFICATE OF CORRECTION

PATENT NO. : 5,597,496

DATED : January 28, 1997

INVENTOR(S) : Inaba, et al

It is certified that error appears in the above-indentified patent and that said Letters Patent is hereby corrected as shown below:

Column 8, line 24, "7" should read -- 9 --.

Signed and Sealed this

Fourteenth Day of October, 1997

Attest:

BRUCE LEHMAN

*Attesting Officer* *Commissioner of Patents and Trademarks*